United States Patent [19]

Schleifstein

[11] Patent Number: 5,370,818
[45] Date of Patent: Dec. 6, 1994

[54] FREE-FLOWING CATALYST COATED BEADS FOR CURING POLYESTER RESIN

[75] Inventor: Robert A. Schleifstein, Edison, N.J.

[73] Assignee: Potters Industries, Inc., Parsippany, N.J.

[21] Appl. No.: 68,975

[22] Filed: May 28, 1993

[51] Int. Cl.$^5$ .............................................. C09K 3/00
[52] U.S. Cl. ........................ 252/186.25; 252/186.26; 252/186.42; 428/361; 428/402; 428/403; 428/406; 428/407; 525/437
[58] Field of Search .................. 252/186.25, 186.26, 252/186.42; 428/361, 402, 403, 406, 407; 525/437

[56] References Cited

U.S. PATENT DOCUMENTS

| | | | |
|---|---|---|---|
| 2,895,919 | 7/1959 | Gerbart | 502/160 |
| 2,897,732 | 8/1959 | Shuger | 404/14 |
| 3,110,614 | 11/1963 | de Vries | 428/405 |
| 3,252,376 | 5/1966 | De Vries | 359/539 |
| 3,254,563 | 6/1966 | De Vries et al. | 359/539 |
| 3,441,535 | 4/1969 | Beacham et al. | 523/203 |
| 3,492,149 | 1/1970 | Zisman et al. | 428/379 |
| 3,492,150 | 1/1970 | Zisman et al. | 428/379 |
| 3,519,594 | 7/1970 | Michaels | 523/205 |
| 3,971,753 | 7/1976 | Frechtling et al. | 524/789 |
| 4,034,139 | 7/1977 | Mazarguil et al. | 428/405 |
| 4,111,893 | 9/1978 | Gasman et al. | 523/213 |
| 4,214,914 | 7/1980 | Ivanchev et al. | 106/308 |
| 4,305,863 | 12/1981 | Adachi et al. | 523/214 |
| 4,574,109 | 3/1986 | LaRoche | 428/325 |
| 4,609,587 | 9/1986 | Giordano et al. | 428/325 |
| 4,713,295 | 12/1987 | LaRoche | 428/406 |
| 4,728,700 | 3/1988 | Patterson | 524/611 |
| 4,917,816 | 4/1990 | Self | 252/186.26 |
| 5,258,071 | 11/1993 | LaRoche | 106/447 |

FOREIGN PATENT DOCUMENTS

| | | |
|---|---|---|
| 47824 | 4/1974 | Australia . |
| 0701284 | 12/1967 | Belgium . |
| 835821 | 3/1970 | Canada . |
| 0003836 | 9/1979 | European Pat. Off. . |
| 0056771 | 7/1982 | European Pat. Off. . |
| 0093495 | 11/1983 | European Pat. Off. . |
| 0165906 | 12/1985 | European Pat. Off. . |
| 2363012 | 7/1975 | Germany . |
| 2836892 | 3/1980 | Germany . |
| 3022300 | 12/1980 | Germany . |
| 3041100 | 5/1981 | Germany . |
| 3223010 | 12/1983 | Germany . |
| 53-140396 | 12/1978 | Japan . |
| 55-025400 | 2/1980 | Japan . |
| 55-073524 | 6/1980 | Japan . |
| 57-096822 | 6/1982 | Japan . |
| 61-252216 | 11/1986 | Japan . |
| 1037873 | 8/1966 | United Kingdom . |
| 1067940 | 5/1967 | United Kingdom . |
| 1154055 | 6/1969 | United Kingdom . |
| 1183289 | 3/1970 | United Kingdom . |
| 1191688 | 5/1970 | United Kingdom . |
| 1284676 | 8/1972 | United Kingdom . |
| 1410085 | 10/1975 | United Kingdom . |
| 1436997 | 5/1976 | United Kingdom . |
| 1517910 | 7/1978 | United Kingdom . |
| 1520856 | 8/1978 | United Kingdom . |
| 2027042 | 2/1980 | United Kingdom . |
| 1577509 | 10/1980 | United Kingdom . |
| 2161489 | 1/1986 | United Kingdom . |
| 2175224 | 11/1986 | United Kingdom . |
| 8810801.4 | 2/1989 | United Kingdom . |

OTHER PUBLICATIONS

Chemical Abstracts, vol. 102 (24), Abstract No. 204806b (1985).
Chemical Abstracts, vol. 74 (14), Abstract No. 64948a (1971).

Primary Examiner—Samuel A. Acquah
Attorney, Agent, or Firm—Curtis, Morris & Safford

[57] ABSTRACT

As an article of manufacture, stable particles containing, in combination, inorganic filler material, benzoyl peroxide and a non-hygroscopic stabilizer for benzoyl peroxide; their production; and the formation of a polymeric matrix with such particulate matter.

26 Claims, No Drawings

FREE-FLOWING CATALYST COATED BEADS FOR CURING POLYESTER RESIN

FIELD OF THE INVENTION

This invention relates to catalyst-bearing particles especially inorganic filler material coated with benzoyl peroxide, their production and the formation of a polymeric matrix with such particulate matter.

BACKGROUND OF THE INVENTION

Inorganic filler material, particularly vitreous beads, are widely used as additives in polymeric compositions, such as those deposited on highways to provide reflective markers, for instance, edge and lane striping, signs, etc. As is well known, it has become common practice to drop small glass spheres onto a painted line on a highway while the paint is still tacky such that the spheres are partially embedded in the paint when it has dried. The spheres render the line or other marker retroreflective and reflect the light from headlights so that the marker is more visible to the motorist. In some cases the spheres are embedded in spherical or irregularly shaped plastic granules prior to being contacted with the paint in the manner disclosed in U. S. Pat. Nos. 3,252,376 and 3,254,563, for example, in an effort further to improve the reflectivity of the marker.

It is also known to provide inorganic filler material having a catalyst fixed to the surface of the filler material to effect polymerization of a polymerizable material upon contact of the catalyst-containing filler material with the polymerizable material in the manner disclosed in British published patent application 88 10 801.4. The catalyst is fixed to the surface of the filler material by means of a fixing agent adhered to the filler material. A particularly preferred catalyst is benzoyl peroxide. However, it appears that particulate material containing benzoyl peroxide and the fixing agents disclosed in such patent application could have been rendered unstable by the use of organic liquids. These solvents and/or binding agents could have destabilized the benzoyl peroxide dispersion as they bound the benzoyl peroxide to the filler surface. The incorporation of conventional stabilizing agents for benzoyl peroxide, such as taught in U.S. Pat. No. 4,917,816, in order to give some stability to the particulate material yields particles which, in volume quantities, do not have good flowability.

It would be a substantial advance to provide inorganic filler material incorporating benzoyl peroxide catalyst, which is both stable and free-flowing for convenient processing, and effects catalysis of the curing of a polymerizable material in which the filler material is included.

OBJECTS OF THE INVENTION

It is thus an object of the invention to provide an article of manufacture comprising an inorganic filler material which effectively catalyzes the curing of polymerizable material in which it is included.

It is a further object of the invention to provide an article of manufacture comprising a stable particle of inorganic filler material incorporating benzoyl peroxide.

It is another object of the invention to provide, as an article of manufacture, a free-flowing particulate matter containing inorganic filler material and benzoyl peroxide.

A further object of the invention is to provide methods of forming such article of manufacture, and methods of forming a polymeric matrix using such article of manufacture.

These and other objects of the invention will be readily apparent from the following description and claims.

SUMMARY OF THE INVENTION

In one aspect, the present invention is an article of manufacture comprising a stable particle containing, in combination, inorganic filler material, benzoyl peroxide and a non-hygroscopic stabilizer for benzoyl peroxide. The composition can further contain an accelerator for benzoyl peroxide catalytic activity or a surfactant. Advantageously, the surfactant facilitates adherence, especially direct adherence, of the benzoyl peroxide to the inorganic filler material without itself effecting such adherence.

In another aspect, the present invention is a multiplicity of stable catalyst-bearing particles, each of said particles containing inorganic filler material, benzoyl peroxide and a non-hygroscopic stabilizer for benzoyl peroxide, said multiplicity of particles being free-flowing.

In several especially advantageous embodiments, the particle consists essentially of inorganic filler material, benzoyl peroxide adhered directly to said inorganic filler material, a metal-free and silane-free surfactant for facilitating adherence of the benzoyl peroxide to the inorganic filler material without itself effecting such adherence, and a non-hygroscopic stabilizer for benzoyl peroxide. In other good embodiments multiplicity of such particles is provided.

The invention is also a method of forming a stable catalyst-bearing filler particle by combining inorganic filler material, benzoyl peroxide and a non-hygroscopic stabilizer for benzoyl peroxide. Advantageously, the method includes the steps of combining a particle of inorganic filler material and a metal-free, silane-free surfactant, and contacting the surfactant-treated particle with benzoyl peroxide and a non-hygroscopic stabilizer for benzoyl peroxide.

In addition, the invention is a method of forming a polymeric matrix by addition-polymerization via the steps distributing in an addition-polymerizable material a multiplicity of stable catalyst-bearing filler particles, and subjecting the addition-polymerizable material containing the filler particles to conditions suitable for forming a polymeric matrix by addition-polymerization. In particular, the particles consist essentially of inorganic filler material, benzoyl peroxide adhered directly to said inorganic filler material, a metal-free and silane-free surfactant for facilitating adherence of the benzoyl peroxide to the inorganic filler material without itself effecting such adherence, and a non-hygroscopic stabilizer for benzoyl peroxide.

Practice of the invention enables realization of several important advantages. The use of catalyst coated beads for curing polyester resin allows simplified application of glass beads, polyester paint and catalyst for preparing road markings. In particular, the disadvantageous step of separately applying liquid peroxide catalyst for curing the polyester paint is avoided. Furthermore, the catalyst-bearing particles of the present invention incorporate an advantageously stabilized catalyst, avoiding the use of prior inorganic filler materials having peroxide catalyst fixed to the surface thereof. Moreover, the catalyst-bearing particles of the present invention are advantageously free-flowing, providing a significant benefit especially under humid application conditions.

DESCRIPTION OF CERTAIN PREFERRED EMBODIMENTS

A central aspect of the invention is the use of a non-hygroscopic stabilizer. This is generally a salt which does not release water of hydration when held for any appreciable time (such as the time necessary for drying of the catalyst) at 50° C. or less. This enables the attainment of catalyst coated particulate material which has good flowability, and is in favorable contrast to the use of conventional stabilizers of the hygroscopic variety. As it turns out, the use of hygroscopic materials causes the catalyst coated particles to clump or otherwise agglomerate in such manner as to be unacceptably resistant to flow.

Another important feature of the claimed invention is the uniform application of tightly and directly adherent catalyst to the bead. By "adherent" is meant that the catalyst is held firmly against the inorganic filler material; while not intending to be bound by the following theory, I believe that the "adherence" is principally physical in that the catalyst uniformly coats the inorganic filler material and that the intrinsic structural integrity of the coating (upon drying and hardening) maintains that coating in effective contacting relationship with the inorganic filler material. (Of course, it will be appreciated that there can be surfactant and/or stabilizer deposits interposed between the coating and the inorganic filler material, but this is embraced within the meaning of the concepts "direct" and "effective contacting relationship".) The thrust of this is that the catalyst stays on the inorganic filler material without the need for linking the two together via a binding agent. Rather, it has been discovered that the benzoyl peroxide catalyst can be conveniently, substantially uniformly and permanently applied to the inorganic filler material by first "wetting" the material with a surfactant (for instance, a dispersion of surfactant in water) to promote its receptivity to the catalyst, contacting the surfactant-treated material with benzoyl peroxide and a stabilizer, and "baking" (i.e., heating) the material at a temperature sufficient to dry the catalyst on to the inorganic filler material. By practice of the invention, catalyst is adhered directly and substantially uniformly to the surface of the inorganic filler material. Typically, the heating is conducted at a temperature of from 35° to 50° C. for a time sufficient to effect drying and hardening of the catalyst.

The advantage of proceeding in accordance with the invention is that the use of a binding agent is avoided. The use of a binding agent can be detrimental because such conventional ones as silanes are in effect thermo-setting materials which tend to "shrink" when curing upon heating, which causes the catalyst linked thereto to coalesce into globules on the inorganic filler material. This is, of course, antithetical to securing the uniformity of catalyst coating desired, and further leads to flaking off of the catalyst globules.

Yet another important feature is the rapid cure of the polymerizable material (e.g., the polyester resin paint) provided by the present invention without use of specialized application equipment. The use of catalyst-containing filler material in accordance with the instant invention is beneficial because the tightly adherent catalyst remains on the particle, rather than flaking off, and is therefore, uniformly distributed throughout the polymerizable material for maximum speed and effectiveness. In this connection, each of the particles of filler material is advantageously uniformly coated with the catalyst for increased distribution of catalyst on a local basis.

The present invention is directed to the deposition of catalyst on inorganic glass filler materials which are non-hygroscopic. Glasses such as A-glass (soda lime glass), C-glass (chemically resistant glass) and E-glass (borosilicate glass) are included. Also, other non-hygroscopic materials such as ceramics are contemplated. The catalyst is incorporated in an amount of from 0.4 to 2 percent based on the weight of the inorganic filler material.

Preferably, the stabilizer is a salt containing water of hydration within a crystal lattice. In particular, the stabilizer is $CaSO_4.nH_2O$, wherein n is from 0.5 to 2, such as gypsum (n=2) or plaster of paris (n=0.5), aluminum oxide trihydrate or magnesium hydroxide. The stabilizer is typically included in the catalyst coated particle in an amount effective to prevent un-wanted rapid decomposition of the benzoyl peroxide, preferably, from 0.1 to 1.0 percent based on the weight of the inorganic filler material.

The accelerator, if one is used, can be any suitable conventional substance. Typically, the accelerator for benzoyl peroxide catalytic activity is $NaH_2PO_4.H_2O$ or $Na_2HPO_4.7H_2O$.

The surfactant can be generally a non-ionic surfactant which is suitable for "wetting" the surface of the inorganic filler material to obtain the desired amount of catalyst deposited thereon. In several good embodiments of the invention the surfactant is a compound of the formula

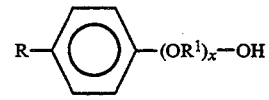

wherein R is hydrogen or $C_nH_{2n+1}$, or an aromatic moiety with a hydrophobic terminal group, such as $C_8$–$C_{12}$ aliphatic; $R^1$ is $C_nH_{2n}$ or can be a linear or branched alcohol of $C_9$–$C_{15}$; x is 4 to 40 (preferably 6–10); and n is 1 to 20, particularly a compound of the formula

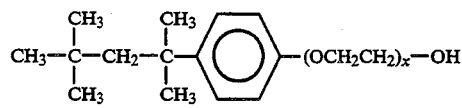

wherein x is 6 to 10. The surfactant is incorporated in the catalyst-coated particle in an amount which is commensurate with the amount necessary to achieve the desired amount of catalyst deposition on the inorganic filler material's surface, preferably 0.05–0.5 percent based on the weight of the inorganic filler material, especially about 0.2 percent (It will be on the weight of the IFM appreciated that the amount of surfactant and stabilizer incorporated in the catalyst coated particles will typically increase, all other things being equal, with a decrease in particle size as each particle will thus have more surface area.)

Unsaturated polyester resin syrups which may be catalyzed by the peroxide compositions of the present invention include unsaturated polyester resins having a copolymerizable monomer which contains a terminal vinyl group. The unsaturated polyester resin may be derived from the polyesterification of a polycarboxylic acid or a polycarboxylic acid anhydride with a polyol according to techniques well known to those skilled in the art. Since the polyester resin to be produced is unsaturated, the polycarboxylic acid or anhydride, the polyol, or both must contain at least one ethylenicly unsaturated bond in the structure.

The polyester resins, for example, in general are formed by the reaction of one or more dicarboxylic acid components and one or more polyhydric alcohols. Illustrative dicarboxylic acid components include saturated anhydrides and adipic and azelaic acids, and the unsaturated components fumaric acid and maleic acid. The commonly used dihydric alcohols include glycols of ethylene, propylene, 1,3- and 2,3-butylene, diethylene and dipropylene. The polyester reaction products are mixed with an unsaturated monomeric cross-linking agent for the polyester resin such as styrene. Other materials that may be employed as a monomeric agent include methyl methacrylate, vinyl toluene, vinyl acetate, ortho and para methyl styrene, divinyl benzene, ethyl acrylate and many others. The monomeric agent is of the nature such that it is consumed during the curing of the resin without forming volatile materials.

Typically, the inorganic filler material and the surfactant are mixed together in a rotary mixer, to which the catalyst and stabilizer are then added; however, other mixing apparatus which is capable of effectively administering these components (especially the heavy mixture of all of them combined) is suitable. The amount of surfactant, catalyst and stabilizer used is sufficient to yield an amount of each such component in the catalyst coated particle falling within the ranges disclosed in preceding paragraphs.

The present invention is further described and illustrated in the following examples. Further objects of this invention, together with additional features contributing thereto and advantages accruing therefrom, will be apparent from the following examples of the invention. It will be appreciated that variations and modifications to the products and methods can be made by the skilled person without departing from the spirit or scope of the invention as defined in the appended claims.

EXAMPLE 1

One hundred pounds of glass beads as inorganic filler material was charged into a clean stainless steel tumbler. The tumbler had an explosion-proof motor and heating system. Proper ventilation was provided. Tumbling of the beads was begun without heating.

Triton X-100 (commercially available from Union Carbide Corp.) surfactant, pre-diluted to a 20 weight percent solution, was added to the tumbler in an amount of 113.5 grams of surfactant per 100 pounds of beads (corresponding to 567.5 grams of water and 113.5 grams of Triton X-100 per 100 pounds of beads). The mixture was tumbled for several minutes.

Gypsum-stabilized benzoyl peroxide (commercially available under the name Abcat 40 from ABCO Industries, Inc., Roebuck, S.C.) was slowly added to the tumbler over several minutes in an amount of three pounds of Abcat 40 per 100 pounds of beads. The beads were now very wet and heavy.

The coated beads were heated as fast as possible to a temperature of 45°–50° C. The beads were held at this temperature for five minutes.

The beads were homogeneously coated with a smooth and even benzoyl peroxide coating.

EXAMPLE 2

The beads of Example 1 were exposed overnight to an atmosphere of 95° F. and 94% relative humidity. The beads did not produce a "wet-sand" texture and remained free-flowing.

EXAMPLE 3

Cure rates were compared using conventionally stabilized benzoyl peroxide (commercially available under the name Abcure 40-25 from ABCO Industries, Inc., Roebuck, S.C.) and using benzoyl peroxide stabilized with a non-hygroscopic stabilizer according to the present invention.

To 10 grams of resin, either 0.3 grams of the conventionally stabilized benzoyl peroxide (Abcure 40-25) were added or 0.3 grams of benzoyl peroxide stabilized with a non-hygroscopic stabilizer in accordance with the present invention were added.

Cure times were observed at 78° F. The results were as follows:

| Catalyst | Initial Cure Time (Min.) | Final Cure Time (Min.) |
| --- | --- | --- |
| Abcat 40 | 2.33 | 3.46 |
| Abcure S-40-25 | 6.13 | 7.70 |

This shows that the benzoyl peroxide catalyst stabilized by the non-hygroscopic stabilizer in accordance with the present invention provided superior cure time compared with a conventionally stabilized benzoyl peroxide catalyst.

EXAMPLE 4

Cure times for 10 grams of beads coated with 3% Abcat 40 dispersion, blended with 10 grams of styrenated unsaturated polyester resin were as follows:

| Sample No. | Final Cure Time (Min.) |
| --- | --- |
| Run #1 | 4.02 |
| Run #2 | 3.85 |

These cures times approached those obtained with Abcat 40 shown in Example 3.

COMPARATIVE EXAMPLE 5

Abcure S-40-25 coated beads were too clumped together for testing within 12 hours after coating.

What is claimed is:

1. As an article of manufacture, a stable particle which consists essentially of, in combination
    inorganic filler material,
    benzoyl peroxide and
    a non-hygroscopic stabilizer for benzoyl peroxide.
2. As an article of manufacture, the stable particle as claimed in claim 1, wherein the stabilizer is a salt containing water of hydration within a crystal lattice.

3. As an article of manufacture, the stable particle as claimed in claim 2, wherein the stabilizer is gypsum.

4. As an article of manufacture, the stable particle as claimed in claim 2, wherein the stabilizer is $CaSO_4 \cdot nH_2O$, wherein n is from 0.5 to 2.

5. As an article of manufacture, the stable particle as claimed in claim 1, further consisting essentially of an accelerator for benzoyl peroxide catalytic activity.

6. As an article of manufacture, the stable particle as claimed in claim 5, wherein the accelerator is $NaH_2PO_4 \cdot H_2O$ or $Na_2HPO_4 \cdot 7H_2O$.

7. As an article of manufacture, the stable particle as claimed in claim 1, wherein the inorganic filler material is a vitreous bead.

8. As an article of manufacture, the stable particle as claimed in claim 1, further consisting essentially of a surfactant.

9. As an article of manufacture, the stable particle as claimed in claim 8, wherein the surfactant is a compound of the formula

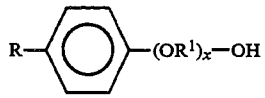

wherein R is hydrogen or $C_nH_{2n+1}$, or an aromatic moiety with a hydrophobic terminal group, $R^1$ is $C_nH_{2n}$ or a linear or branched alcohol of $C_9$—$C_{15}$, x is 4 to 40 and n is 1 to 20.

10. As an article of manufacture, the stable particle as claimed in claim 9, wherein the surfactant is a compound of the formula

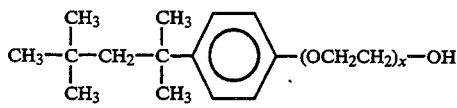

wherein x is 6 to 10.

11. A multiplicity of catalyst-bearing particles, each of said particles consisting essentially of inorganic filler material, benzoyl peroxide and a non-hygroscopic stabilizer for benzoyl peroxide, said multiplicity of particles being free-flowing.

12. As an article of manufacture, a stable particle which consists essentially of, in combination,
inorganic filler material;
benzoyl peroxide adhered directly to said inorganic filler material;
a metal-free and silane-free surfactant for facilitating adherence of the benzoyl peroxide to the inorganic filler material without itself effecting such adherence; and
a non-hygroscopic stabilizer for benzoyl peroxide.

13. A multiplicity of stable catalyst-bearing particles, each of which consists essentially of
inorganic filler material;
benzoyl peroxide adhered directly to said inorganic filler material;
a metal-free and silane-free surfactant for facilitating adherence of the benzoyl peroxide to the inorganic filler material without itself effecting such adherence; and
a non-hygroscopic stabilizer for benzoyl peroxide;
said multiplicity of particles being free-flowing.

14. A composition which consists essentially of benzoyl peroxide and a non-hygroscopic stabilizer for benzoyl peroxide on a substantially free-flowing inorganic filler.

15. A method of forming a stable catalyst-bearing filler particle, which comprises combining inorganic filler material, benzoyl peroxide and a non-hygroscopic stabilizer for benzoyl peroxide.

16. A method of forming a stable catalyst-bearing filler particle, which comprises
combining a particle of inorganic filler material and a metal-free, silane-free surfactant, and
contacting the surfactant-treated particle with benzoyl peroxide and a non-hygroscopic stabilizer for benzoyl peroxide.

17. A method as claimed in claim 15, wherein the stabilizer is a salt containing water of hydration within a crystal lattice.

18. A method as claimed in claim 17, wherein the stabilizer is gypsum.

19. A method as claimed in claim 17, wherein the stabilizer is $CaSO_4 \cdot nH_2O$, wherein n is from 0.5 to 2.

20. A method as claimed in claim 15, wherein the inorganic filler material is a vitreous bead.

21. A method as claimed in claim 16, wherein the stabilizer is a salt containing water of hydration within a crystal lattice.

22. A method as claimed in claim 21, wherein the stabilizer is gypsum.

23. A method as claimed in claim 21, wherein the stabilizer is $CaSO_4 \cdot nH_2O$, wherein n is from 0.5 to 2.

24. A method as claimed in claim 16, wherein the particle of inorganic filler is a vitreous bead.

25. A method as claimed in claim 16, wherein the surfactant is a compound of the formula

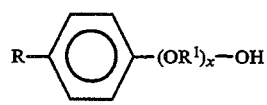

wherein R is hydrogen or $C_nH_{2n+1}$ or an aromatic moiety with a hydrophobic terminal group, $R^1$ is $C_nH_{2n}$ or a linear or branched alcohol of $C_9$—$C_{15}$, x is 4 to 40 and n is 1 to 20.

26. A method as claimed in claim 25, wherein the surfactant is a compound of the formula

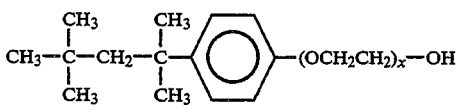

wherein x is 6 to 10.

* * * * *